(12) United States Patent
Hayashi

(10) Patent No.: US 7,777,614 B2
(45) Date of Patent: Aug. 17, 2010

(54) VEHICLE THEFT PREVENTION APPARATUS

(75) Inventor: Michitaka Hayashi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 299 days.

(21) Appl. No.: 12/010,110

(22) Filed: Jan. 22, 2008

(65) Prior Publication Data

US 2008/0186153 A1 Aug. 7, 2008

(30) Foreign Application Priority Data

Feb. 5, 2007 (JP) .............................. 2007-025654

(51) Int. Cl.
*B60R 25/10* (2006.01)
(52) U.S. Cl. ..................................... 340/429
(58) Field of Classification Search ................. 340/429, 340/426.15, 937, 426.1, 438, 440, 463
See application file for complete search history.

(56) References Cited

U.S. PATENT DOCUMENTS

| | | | |
|---|---|---|---|
| 6,243,026 B1 * | 6/2001 | Jones et al. .................. | 340/906 |
| 6,879,247 B2 * | 4/2005 | Shimomura et al. .... | 340/426.18 |
| 7,031,852 B2 | 4/2006 | Kato | |
| 7,505,843 B2 * | 3/2009 | Okada et al. .................. | 701/96 |
| 2006/0244577 A1 * | 11/2006 | Tanaka et al. ............... | 340/429 |

FOREIGN PATENT DOCUMENTS

| | | |
|---|---|---|
| DE | 101 40 068 A1 | 2/2003 |
| DE | 103 23 038 A1 | 2/2004 |
| EP | 1 860 005 A2 | 11/2007 |
| JP | A-04-215547 | 8/1992 |
| JP | A-07-242158 | 9/1995 |
| JP | A-11-154291 | 6/1999 |
| JP | A-2001-153879 | 6/2001 |
| JP | A-2001-270425 | 10/2001 |
| JP | A-2002-150439 | 5/2002 |
| JP | A-2007-015506 | 1/2007 |
| JP | A-2007-137157 | 6/2007 |

OTHER PUBLICATIONS

Office Action dated Dec. 16, 2008 in corresponding Japanese patent application No. 2007-025654 (and English translation).
German Office Action dated Aug. 12, 2009 from the German Patent Office in the corresponding German patent application No. 10 2008 007 221.4-51 (with English translation thereof).

* cited by examiner

*Primary Examiner*—Phung Nguyen
(74) *Attorney, Agent, or Firm*—Posz Law Group, PLC

(57) ABSTRACT

A vehicle theft prevention apparatus has a gyro, a G sensor, and a microcomputer in a case, thereby being capable of detecting a tilt of a vehicle and of detecting inertia applied to the vehicle. An outer surface of the case has a light detector that detects an approach of a suspicious person toward the vehicle. The vehicle theft prevention apparatus has an improved characteristic in terms of ease of installation in the vehicle and cost effectiveness.

2 Claims, 9 Drawing Sheets

VEHICLE THEFT PREVENTION APPARATUS

CROSS REFERENCE TO RELATED APPLICATION

This application is based on and claims the benefit of priority of Japanese Patent Application No. 2007-25654 filed on Feb. 5, 2007, the disclosure of which is incorporated herein by reference.

FIELD OF THE DISCLOSURE

The present disclosure generally relates to aft prevention apparatus for use in a vehicle.

BACKGROUND INFORMATION

In recent years, various techniques are disclosed for protecting theft of the vehicle. That is, for example, aft prevention apparatus disclosed in Japanese patent document JP-A-H07-242158 has an intrusion sensor and a tilt sensor disposed therein for detecting an intrusion of a suspicious person into a vehicle and/or aft of the vehicle by using a wrecker and for providing warning.

The vehicle theft prevention apparatus/system typically has the intrusion sensor and the tilt sensor respectively disposed as separate sensors as shown in FIG. 14. Further, the tilt sensor integrated with an inertia sensor (i.e., a sensor that has both of an angular velocity sensing function and an acceleration sensing function in one body for a skid prevention system) is already publicly known.

However, theft prevention apparatus is currently under pressure of further volume reduction and cost reduction.

SUMMARY OF THE DISCLOSURE

In view of the above and other problems, the present disclosure provides aft prevention apparatus that has improved characteristics in terms of ease of installation and cost-effectiveness.

Theft prevention apparatus of the present invention includes a case; a sensor capable of sensing a tilt of the vehicle and inertia applied to the vehicle; and a detector capable of detecting an approach of a suspicious person. The sensor is disposed in the case and the detector is disposed on an outer surface of the case.

Theft prevention apparatus has a device that detects a tilt of the vehicle and inertia applied to the vehicle in one body, thereby enabling an improved installation efficiency and an improved cost efficiency.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1A:
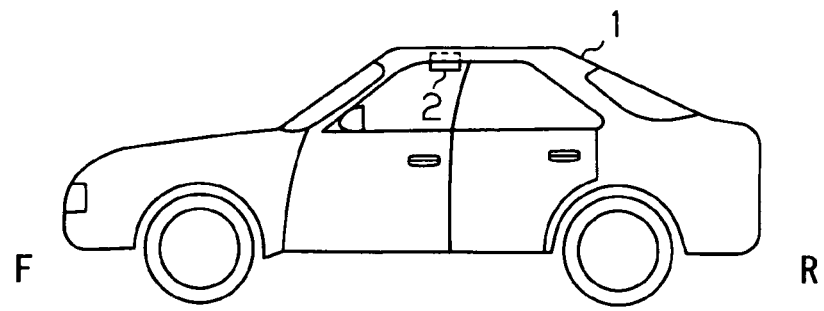
FIGS. 1A and 1B respectively show a side view and a top view of a vehicle having a sensor unit of a vehicle theft prevention apparatus in an embodiment of the present invention.

An embodiment which realizes the present invention as follows is explained according to the drawing. A total configuration of a vehicle 1 is shown in FIGS. 1A, 1B, that is, FIG. 1A is a side view, and FIG. 1B is a top view.

Figure 1B:
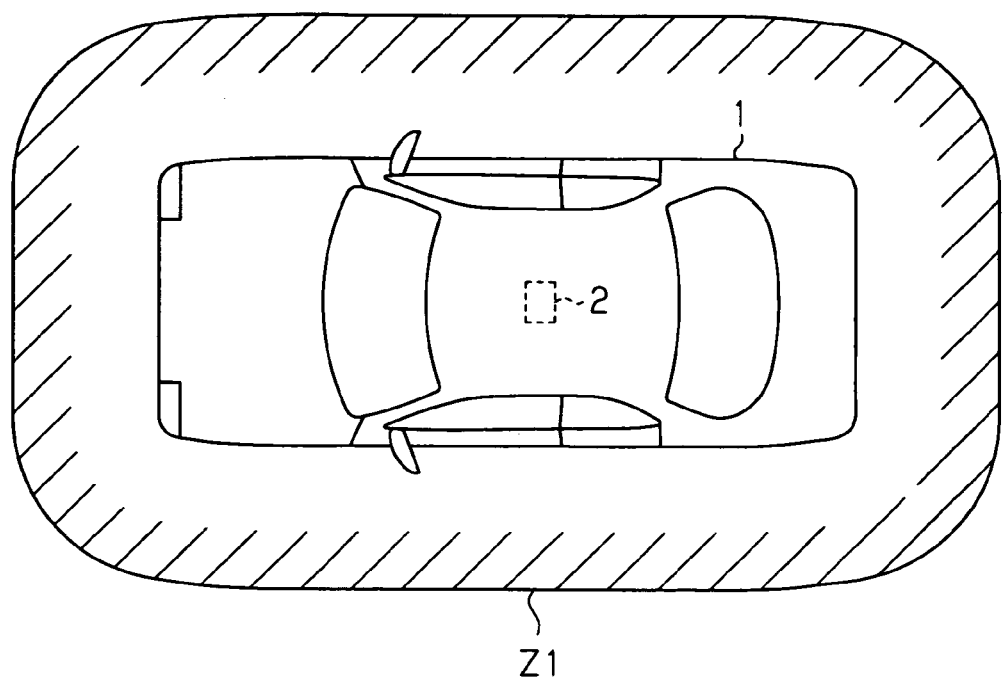

A vehicle theft prevention apparatus in the present embodiment includes a sensor unit 2 as shown in FIGS. 1A, 1B, and the sensor unit 2 is installed on a ceiling side in the compartment of the vehicle. The details of the sensor unit 2 are shown in FIGS. 2A, 2B.

Figure 2A:
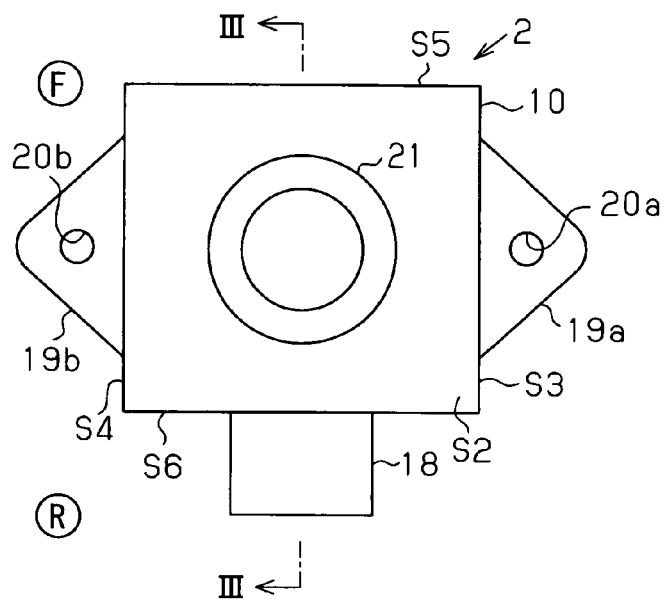
FIGS. 2A and 2B respectively show a plan view and a side view of the sensor unit.
Figure 2B:
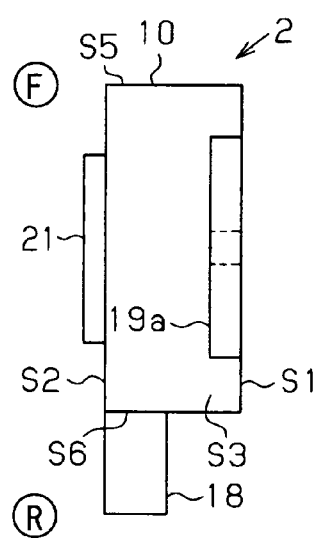

FIG. 2A is a plan view of the sensor unit 2, and FIG. 2B is a side view of the sensor unit 2. A cross section of the unit 2 along a line III-III in FIG. 2A is shown in FIG. 3.

Figure 3:
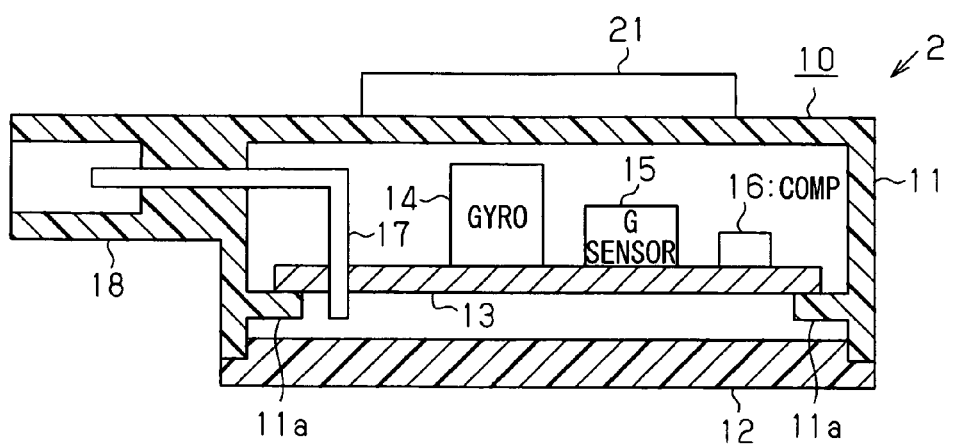
FIG. 3 shows a cross-sectional view of the sensor unit along a line III-III in FIG. 2A.

In FIGS. 2A, 2B, 3, a case 10 makes a box of the hexahedron as total shape. The case 10 consists of a case body 11 and a cover 12. The case body 11 makes the box which one face is opened. The cover 12 is put on in the opening of the case body 11, and the opening of the case body 11 is blocked up.

A printed circuit board 13 is received in the case 10. The printed circuit board 13 is disposed on a projecting projection 11a in an inside of the case body 11, and it is fixed in a horizontal direction. A gyro 14, a G sensor 15, a microcomputer 16 and the like are put on the printed circuit board 13 in the inside of the case 10.

It is implemented in a condition that a connector pin 17 penetrates the printed circuit board 13 in the case 10. The connector 18 is formed on the case body 11, and the connector pin 17 is disposed in the connector 18. The connector 18 enables an electrical connection from outside to a part in the case 10 through the connector pin 17 when the connector 18 is inserted into another connector.

As for the case 10 making a box of hexahedron, a face S1 of one of six faces is a mounting surface. The face S1 is installed on the ceiling side of the vehicle as shown in FIG. 1A. In other words, the face S1 is the top surface in the installation condition of the sensor unit 2 in the vehicle 1, and a face S2 that opposes the face S1 is considered as a lower face. Further, other than faces S1 and S2, among four remaining faces, a face S3 is on the right side, a face S4 is on the left side, a face S5 is on the front side, and a face S6 is on the back side.

A mounting plate 19a is formed on the right face S3 of the case 10, and a mounting plate 19b is formed on the left face S4 of the case 10. Attachment holes 20a, 20b are formed in mounting plate 19*a*, 19*b*, and the sensor unit 2 is fixed on the ceiling face of the vehicle by screwing a screw penetrating the attachment holes 20*a*, 20*b* on the ceiling face of the vehicle.

In the face S2 facing the face S1 of the case 10, an optical sensor 21 for detecting a suspicious individual approaching the vehicle 1 is installed. The optical sensor 21 has a source of light and a detector, and light emitted from a source of light reflects on a person, and a suspicious individual is detected by presence of the reflected light by using the detector. The optical sensor 21 in the present embodiment makes a ring shape, and light is emitted in all directions of the vehicle in the horizontal direction, and presence of the reflected light for the emitted light is detected. The detection area of the suspicious individual by the optical sensor 21 is shown in a mark Z1 in FIG. 1B, and the suspicious individual detection area Z1 concerned is defined as an area within a constant distance in the vehicle circumference.

Figure 4:
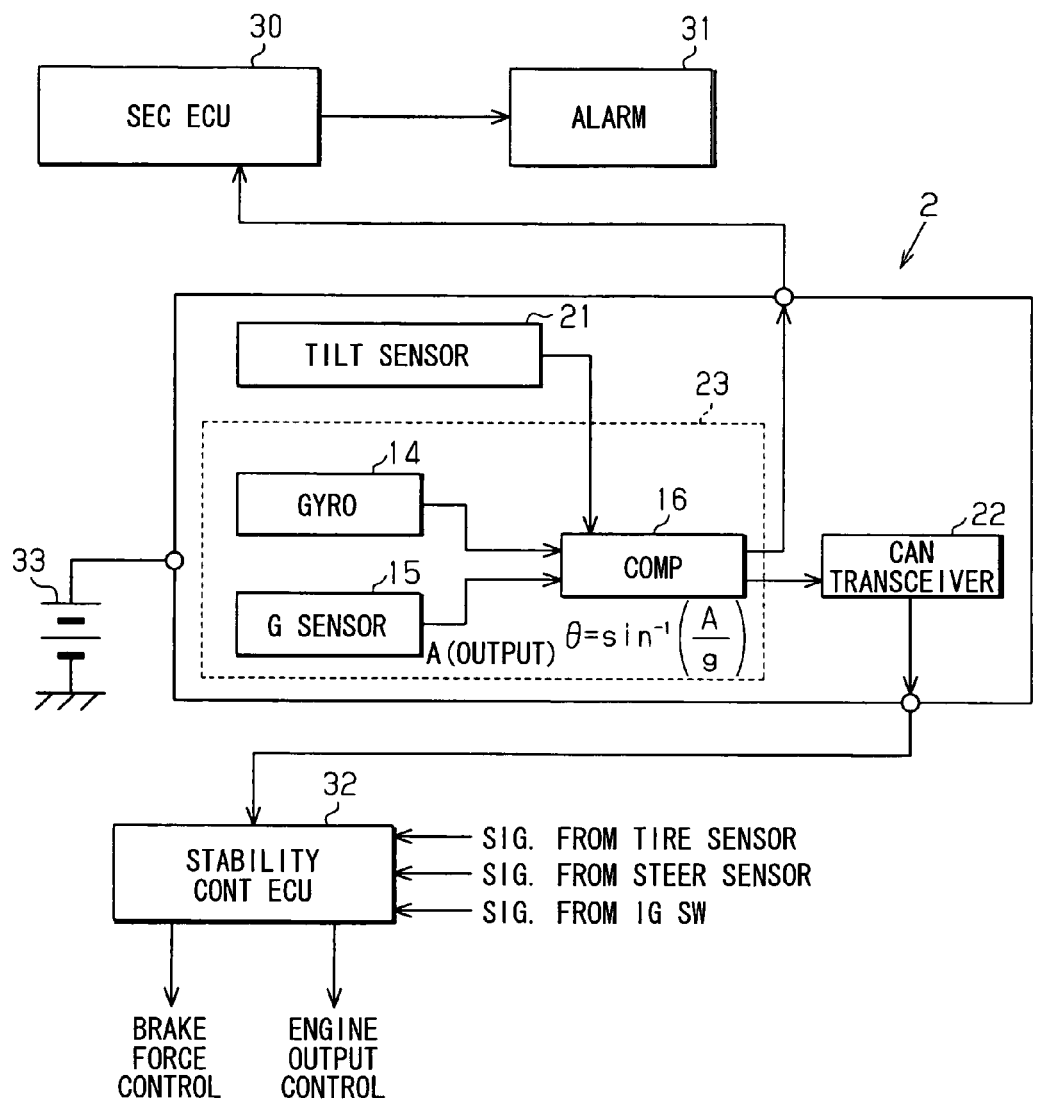
FIG. 4 shows a block diagram of an electric circuit of the sensor unit.

An electric constitution of the vehicle theft prevention apparatus in the present embodiment is shown in FIG. 4. In FIG. 4, the sensor unit 2 possesses a control area network (CAN) transceiver 22 as well as a gyro 14, a G sensor 15, a microcomputer 16, and an optical sensor 21. The gyro 14 and the G sensor 15 are connected to the microcomputer 16. The microcomputer 16 is capable of sending data to external equipments through the CAN transceiver 22. In addition, a battery 33 is connected to the sensor unit 2.

A security ECU (an electronic control unit) 30 is connected to the microcomputer 16 of the sensor unit 2, and data from the microcomputer 16 are sent to the security ECU 30. A warning system (i.e., an alarm) 31 is connected to the security ECU 30.

In addition, ECU (an electronic control unit) for stability control 32 is connected to the CAN transceiver 22 of the sensor unit 2, and data from the microcomputer 16 are sent to ECU 32 for stability control through the CAN transceiver 22. The ECU 32 for stability control inputs the signal from a wheel speed sensor, the signal from a steering angle sensor, the operation signal from an ignition switch and the like.

As for the gyro 14 in the sensor unit 2, the gyro 14 detects an angular velocity, that is, the yaw rate of the vehicle based on the principle of the Coriolis force. In addition, the G sensor 15 detects acceleration in lateral directions of the vehicle. Furthermore, the microcomputer 16 outputs each detection result of the gyro 14 and the G sensor 15 to ECU 32 for stability control through the CAN transceiver 22.

Prevention of sideslip movement is provided during a travel of the vehicle (i.e., when ignition switch turned on) by ECU 32 for stability control. Adjustment of the brake power and adjustment of the engine output are performed, for example. When prevention of the sideslip is controlled, information (a signal) of the gyro 14 and information (a signal) of the G sensor 15 are transmitted to the ECU 32 for stability control.

In addition, the microcomputer 16 and the security ECU 30 are used at a parking time of the vehicle (i.e., when the ignition switch is turned off and a battery voltage is applied) for providing vehicle theft prevention operation.

When prevention of sideslip in the travel of the above-mentioned vehicle is provided, the gyro 14, the G sensor 15, the wheel speed sensor, and the steering angle sensor are used for the sideslip prevention operation of the vehicle control system. On the other hand, at a parking time of the vehicle, the G sensor 15 is used as a tilt sensor. In other words, the tilt of the vehicle is calculated based on an output signal of the G sensor 15 by an operation of the microcomputer 16. The principle to detect an angle of inclination with the G sensor 15 is as follows.

Originally the G sensor detects the acceleration in the horizontal direction. However, when the vehicle is tilted, the sensor unit 2 disposed in the horizontal direction of the vehicle is tilted with the G sensor installed therein, thereby detecting a tilt component of gravity as gravity (9.8 m/s$^2$) multiplied by sin θ when a vehicle is tilted by an angle of θ. The tilt acceleration is sent to the microcomputer 16 for signal processing and tilt determination, and the process result is utilized by the security ECU 30 for prevention of theft by tow trucks or the like.

In addition, intermittent operation of a power supply for driving the G sensor 15 by software of the microcomputer 16 is provided to prevent "battery going dead" because the voltage of battery 33 is used for operating the G sensor 15 at the time of the parking.

The gyro 14, the G sensor 15 and the microcomputer 16 are received in the case 10, thereby having the function to detect an inertial force (angular velocity, lateral direction acceleration) and the function to detect the tilt of the vehicle in the case 10. In addition, the optical sensor 21 is unified to the inertia sensor 23 that has the tilt detection function for security, thereby enabling the theft prevention apparatus to detect an approach of a suspicious individual toward the vehicle, and even providing detection capability of intrusion into the vehicle. In this manner, the inertia sensor, the tilt sensor and an intrusion sensor are substantially unified.

In addition, the microcomputer 16 inputs an operation signal of ignition switch and open/close signals of door operation as well as a set signal from the security ECU 30 and a signal to show the working conditions of each sensor.

Figure 5:
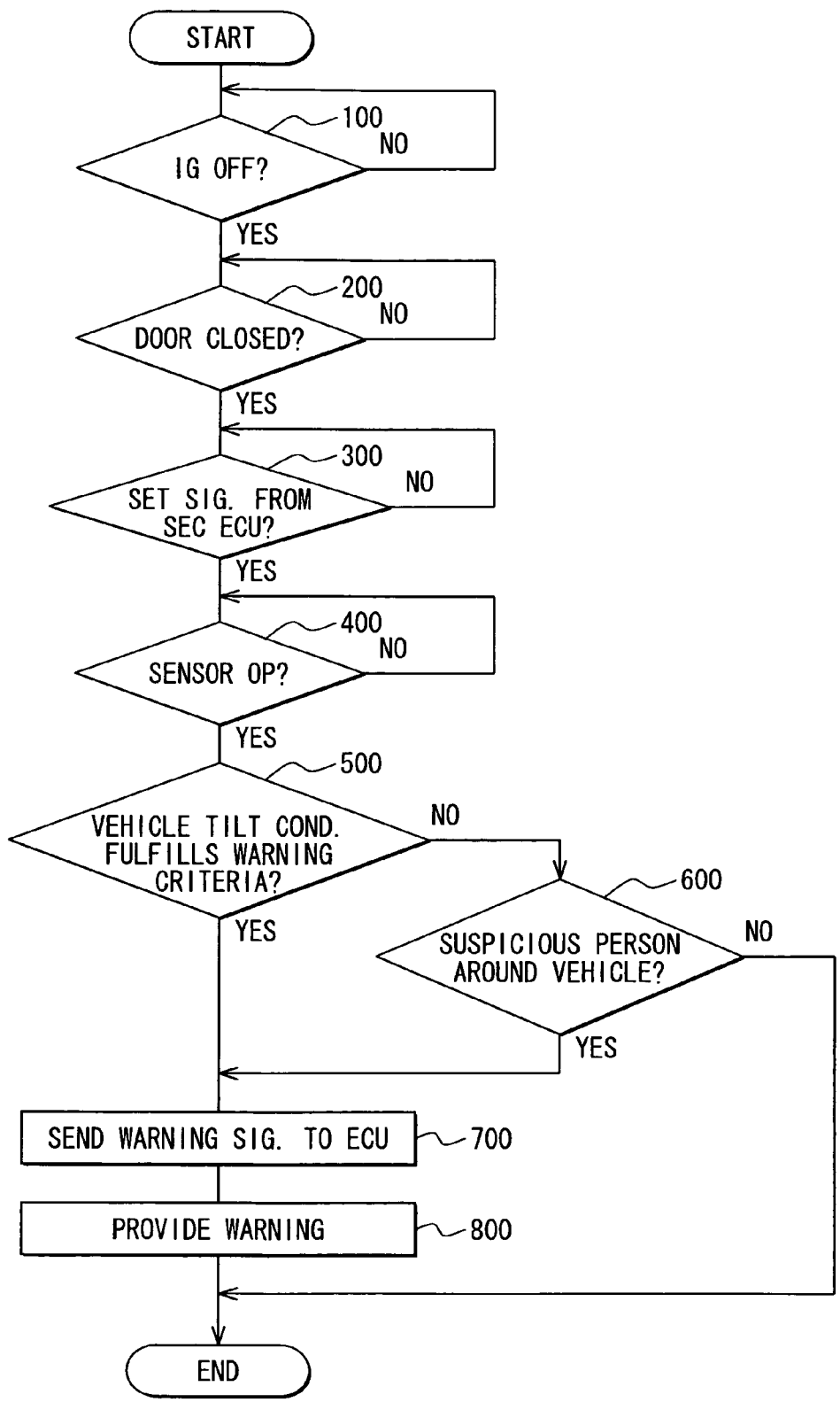
FIG. 5 shows a flowchart of a warning process in the sensor unit.

Operations of the vehicle theft prevention apparatus in the present embodiment is explained in the following. A flowchart is shown in FIG. 5 for a case that a tilt and intrusion has triggered output of a warning signal. As shown in steps 100, 200, 300, 400 of FIG. 5, the microcomputer 16 performs operation in steps 500, 600, 700 when the ignition switch is turned off with the door closed and a set signal from the security ECU 30 being received as well as the sensor is in operation condition.

At first, whether the tilt condition of the vehicle satisfies a warning condition is determined in step 500. Specifically, it is determined whether an angle of tilt, tilt speed, tilt duration time go beyond a threshold value. Then, a warning signal is sent to the security ECU 30 in step 700 when the warning condition is satisfied. The warning is then provided by using sirens or the like from the warning system 31 in step 800.

On the other hand, whether the situation that a predetermined time of stay of a suspicious individual in or around the vehicle satisfies the warning condition is determined in step 600. Specifically, the situation is determined as fulfilling the warning condition when the suspicious individual has stayed within a predetermined distance from the vehicle for a predetermined time or longer. Then, the warning signal is sent to the security ECU 30 in step 700 when the warning condition is satisfied. A warning is provided with sirens by the warning system 31 in step 800.

Figure 14:
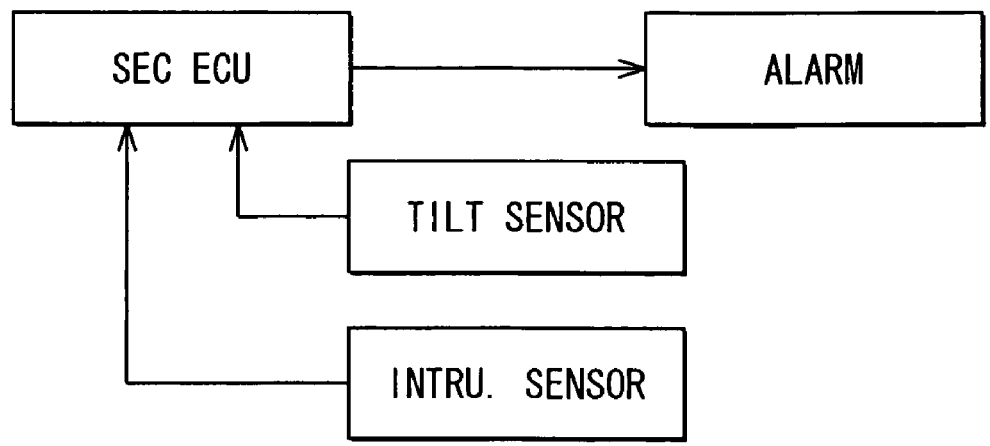
FIG. 14 shows a block diagram of configuration of a conventional security apparatus.

According to the above description, the sensor unit 2 serves as a sensor for sideslip prevention while the ignition switch of the vehicle is turned on (i.e., when the vehicle is running/idling), and serves as a tilt sensor and an intrusion sensor when the vehicle is parked, thereby enabling the sensor unit 2 to be cost-effective with only requiring an installation space of the inertia sensor. Specifically, if the present invention is compared with the prior art in FIG. 14 that the intrusion sensor and the tilt sensor are separately disposed, the present invention has a merit of space utility as well as a reduction of cost due to a compactness of the sensor and the integration of required functions.

In addition, the warning condition determination in step 500 for determining tilt condition followed by the intrusion condition determination in step 600 for determining that the suspicious individual stayed for the predetermined time may be reversed in order (i.e., intrusion condition determination prior to the tilt condition determination) or the two determinations may be concurrently conducted.

Further, processes in steps 100, 200, 400, 500, 600 of FIG. 5 may be performed by the security ECU 30 (in this case, the microcomputer 16 may be configured to send both or one of the tilt angle and the optical sensor output to the security ECU 30).

According to the above embodiment, the following effects can be achieved.

(1) Devices such as the gyro 14, G sensor 15, the microcomputer 16 in the case 10 for detecting the inertial force applied to the vehicle 1 as well as detecting the tilt of the vehicle 1 together with the optical sensor 21 on the outside of the case 10 for detecting an approach of the suspicious individual are provided. Therefore, the sensor 21 detecting the suspicious individual are integrated with the tilt/inertia sensors, thereby reducing the cost and improving the ease of installation of the apparatus.

(2) Further, the intrusion sensor for detecting the suspicious individual is a light sensor 21 thereby enabling a volume reduction of the apparatus.

(3) The optical sensor 21 detecting the suspicious individual approaching the vehicle is arranged in the ring shape as shown in FIG. 2A, thereby enabling detection of the intruder from the all directions for improvement of detection capability.

Although the present invention has been fully described in connection with the preferred embodiment thereof with reference to the accompanying drawings, it is to be noted that various changes and modifications will become apparent to those skilled in the art.

For example, though the optical sensor 21 is arranged on one surface (i.e., on the face S2) of the case 10 as shown in FIG. 2 in the above embodiment, the sensor 21 may be arranged on the face S2 in a manner that is shown in either of FIGS. 6 to 10.

Figure 6A:
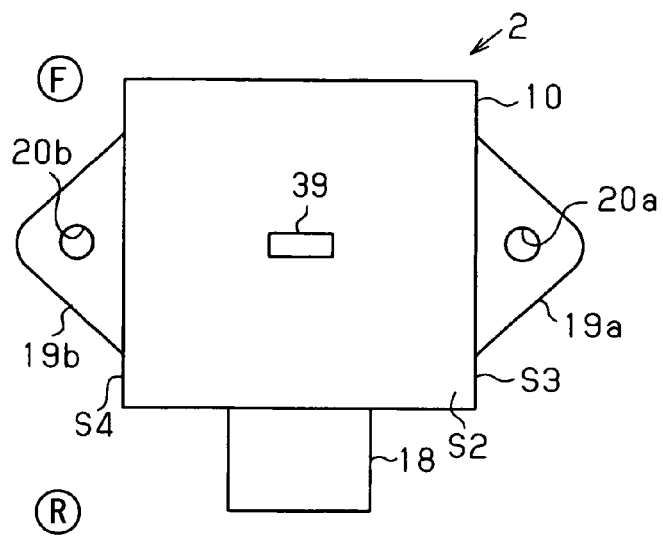
FIGS. 6A and 6B respectively show a plan view and a side view of the sensor unit in another embodiment.
Figure 6B:
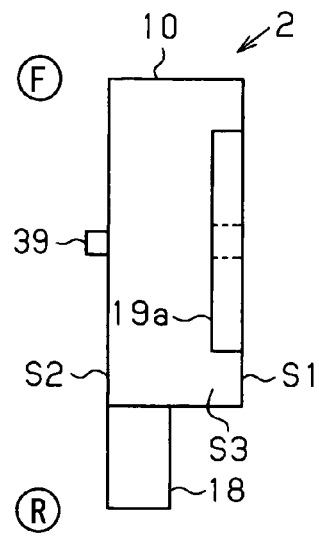

In FIGS. 6A and 6B, one piece of an optical sensor 39 is installed on the face S2 that faces the face S1. In this case, detection direction is toward a front of the vehicle. A circled "F" and a circled "R" in the figure respectively represent the front direction and the rear direction of the sensor unit in the vehicle 1. The same signs are used in the following figures.

Figure 7A:
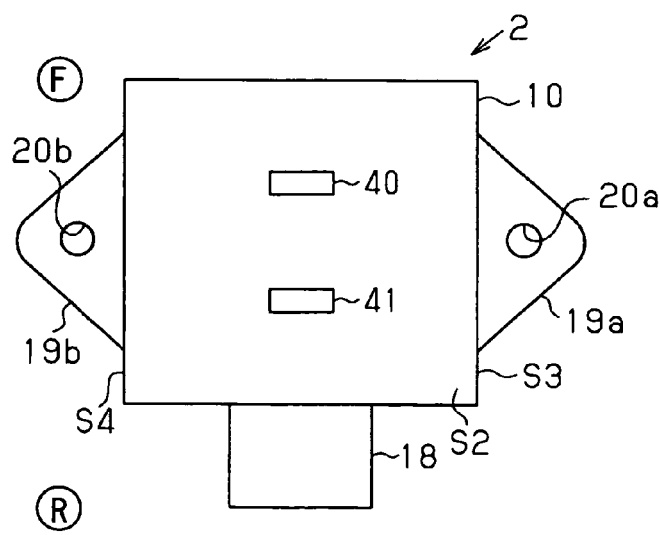
FIGS. 7A and 7B respectively show a plan view and a side view of the sensor unit in yet another embodiment.
Figure 7B:
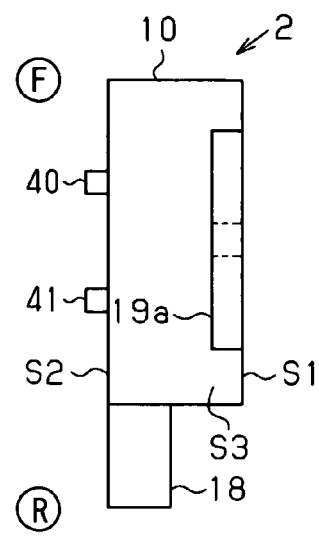

In FIGS. 7A and 7B, two optical sensors 40, 41 are arranged in front and back in the face S2 that faces the face S1. In this case, detection direction is toward a front and rear direction of the vehicle.

Figure 8A:
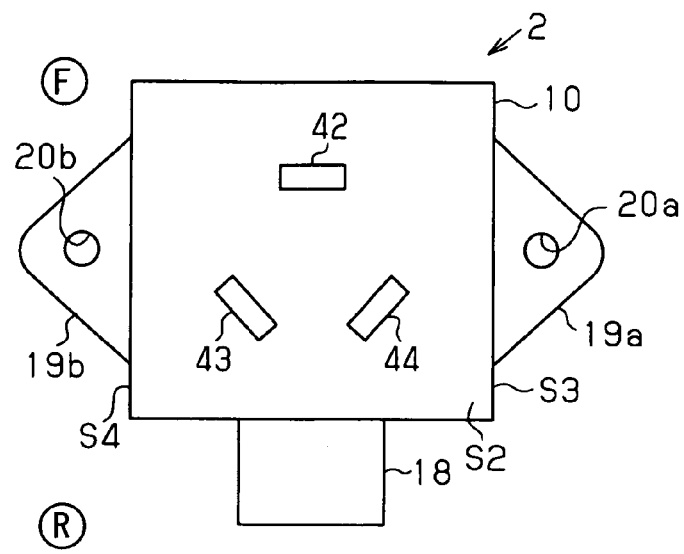
FIGS. 8A and 8B respectively show a plan view and a side view of the sensor unit in still yet another embodiment.
Figure 8B:
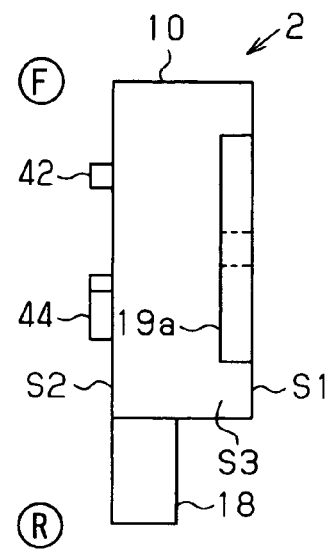

In FIGS. 8A and 8B, three similar optical sensors 42, 43, 44 are arranged in the face S2 that faces the face S1 in the shape of a triangle.

Figure 9A:
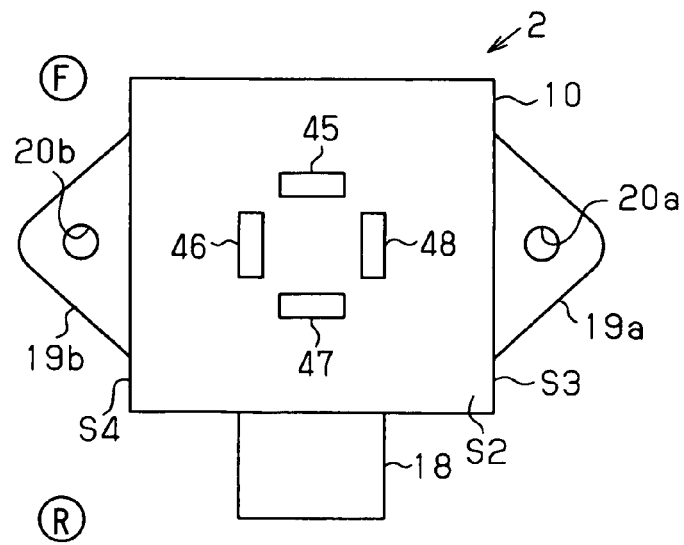
FIGS. 9A and 9B respectively show a plan view and a side view of the sensor unit in still yet another embodiment.
Figure 9B:
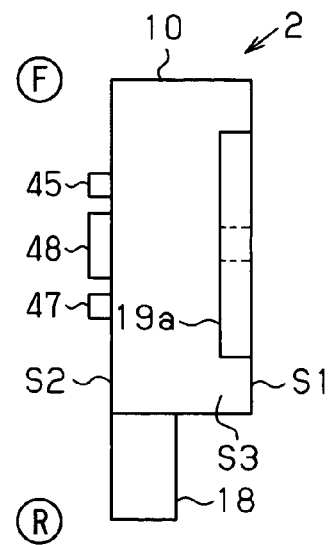

In FIGS. 9A and 9B, four similar optical sensors 45, 46, 47, 48 are arranged in the face S2 that faces the face S1 in the shape of a quadrangle.

Figure 10A:
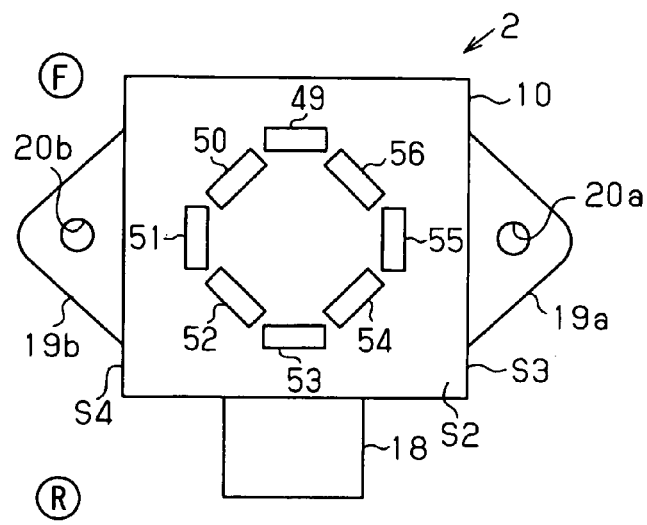
FIGS. 10A and 10B respectively show a plan view and a side view of the sensor unit in still yet another embodiment.
Figure 10B:
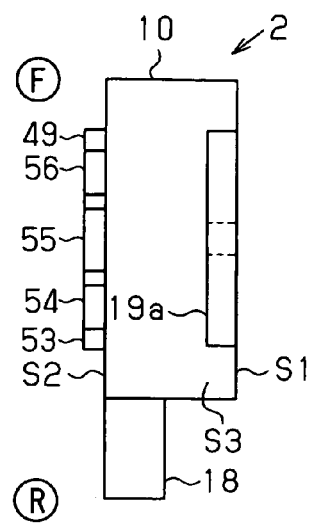

In FIGS. 10A and 10B, eight similar optical sensors 49, 50, 51, 52, 53, 54, 55, 56 are arranged in the face S2 that faces the face S1 in the shape of an octagon.

As shown in FIGS. 6A thru 10B, the sensor (39-56) for detecting the intruder may be disposed on the opposite face of the installation face S1, the number of the sensor may be one piece of plural pieces, and the position of the sensors (42-56) in the face S2 may correspond to each of the sides of the polygonal shape of the face S2. In this manner, the intruder detection capability is improved.

On the other hand, though the optical sensor 21 is arranged on one face of the case 10 in FIG. 2, the sensor 21 may be disposed on the faces other than face S2 as shown in FIGS. 11A-13B.

Figure 11A:
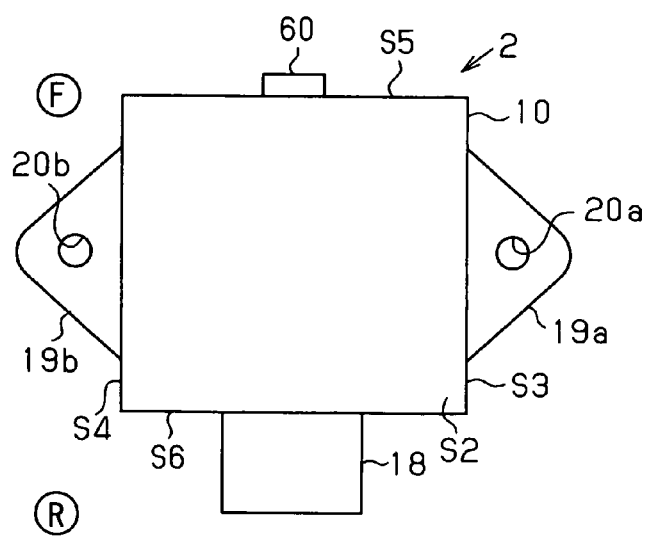
FIGS. 11A and 11B respectively show a plan view and a side view of the sensor unit in still yet another embodiment.
Figure 11B:
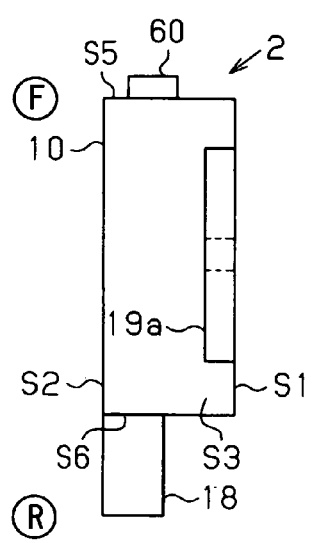

In FIGS. 11A and 11B, an optical sensor 60 is arranged on a front face S5 of the case 10. In this case, detection direction is toward the front of the vehicle.

Figure 12A:
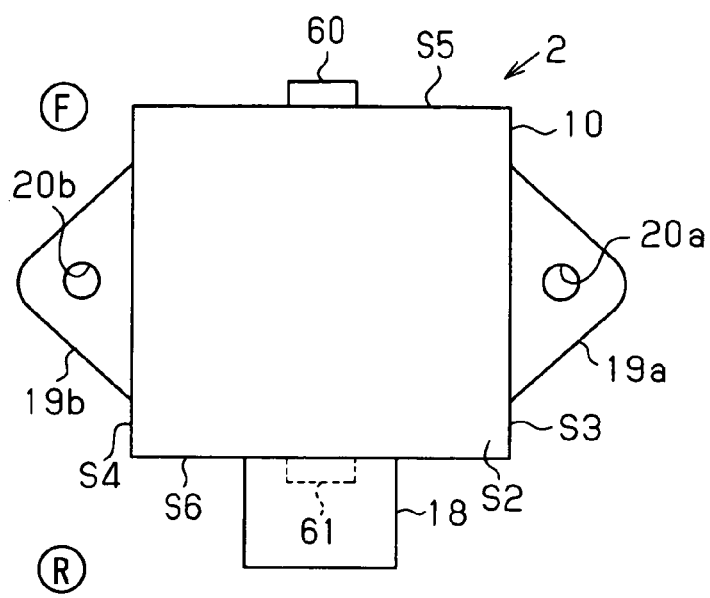
FIGS. 12A and 12B respectively show a plan view and a side view of the sensor unit in still yet another embodiment.
Figure 12B:
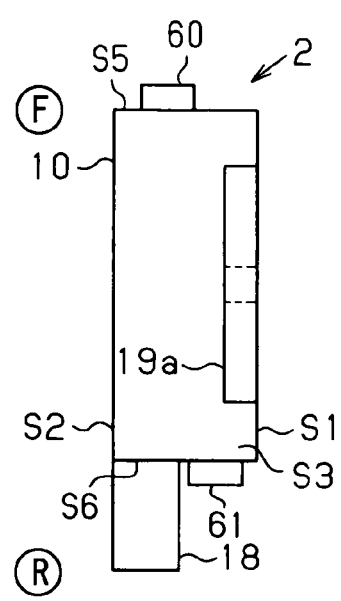

In FIGS. 12A and 12B, two optical sensors 60, 61 are arranged on the front face S5 and on the rear face S6 of the case 10. In this case, detection direction is a front and rear direction of the vehicle.

Figure 13A:
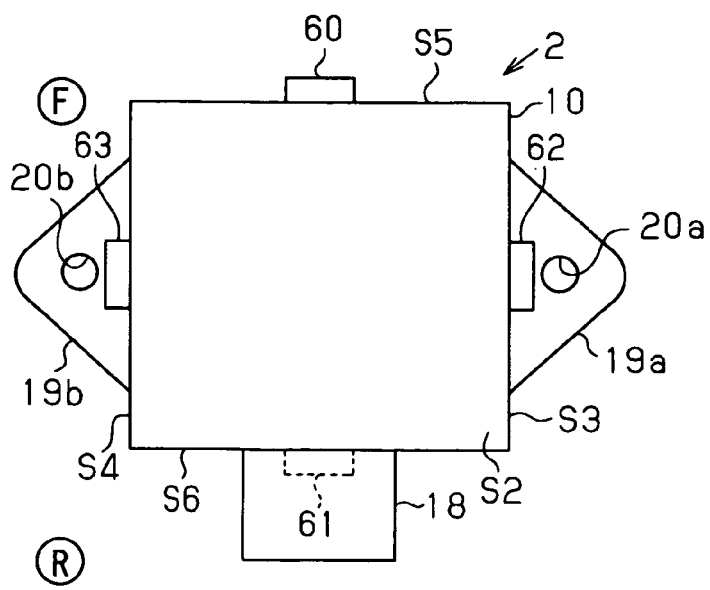
FIGS. 13A and 13B respectively show a plan view and a side view of the sensor unit in still yet another embodiment.
Figure 13B:
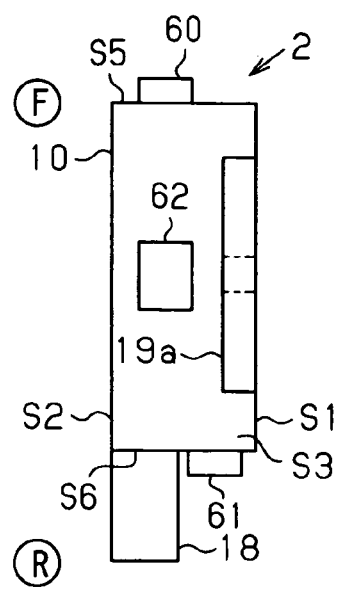

In FIGS. 13A and 13B, four optical sensors 60, 61, 62, 63 are disposed on the front face S5, rear face S6, right face S3 and left face S4 of the case 10. In this case, detection direction is four directions toward a front/rear/right/left of the vehicle.

The sensors 60 to 63 may be disposed on four faces S3-S6 as shown in FIGS. 11A to 13B. More practically, the two opposed faces may have the light sensors 60, 61 disposed thereon. That is, faces S3, S4 or faces S5, S6 may have the sensor 60, 61. Further, all four faces S3 to S6 may have the sensor 60-63.

In addition, the optical sensor may be an image sensor, an infrared sensor, or a camera. These sensors may be used as a single piece, or as a combination. In this case, if the infrared sensor is used as the optical sensor, body temperature is detected, thereby enabling an accurate detection if the intruder is a human being. Further, if the image sensor is used, an image of the intruder is detected, thereby enabling an accurate detection if the intruder is a human being.

Further, the optical sensor may be an ultrasonic sensor for detection of the intruder, or the optical sensor may be combined with the ultrasonic sensor.

Such changes and modifications are to be understood as being within the scope of the present invention as defined by the appended claims.

What is claimed is:

1. A vehicle theft prevention apparatus for use in a vehicle comprising:
   a case in a shape of a hexahedron and including a top side, a bottom side and four outer edge sides,
   the top side of the case is used for installation of the case to the vehicle,
   a sensor capable of sensing a tilt of the vehicle and inertia applied to the vehicle, wherein the sensor is disposed in the case; and
   a plurality of detectors each being one of an optical detector and an ultrasonic sensor, wherein the detectors are arranged in a polygonal configuration disposed on a bottom side of the case to detect an approach of a suspicious person within a suspicious person detection area around the vehicle.

2. The vehicle theft prevention apparatus of claim 1, wherein each of the detectors includes a light sensor, and the light sensor is at least one of an infrared sensor, an image sensor and a camera.

* * * * *